United States Patent [19]
Stieger et al.

[11] Patent Number: 5,317,902
[45] Date of Patent: Jun. 7, 1994

[54] METHOD AND APPARATUS FOR TESTING CONTAINERS

[75] Inventors: Othmar Stieger, Kindhausen; Alfred Wenger, Neftenbach, both of Switzerland

[73] Assignee: Elpatronic AG, Zug, Switzerland

[21] Appl. No.: 909,975

[22] Filed: Jul. 7, 1992

[30] Foreign Application Priority Data

Jul. 8, 1991 [CH] Switzerland ............... 02 022/91
Mar. 16, 1992 [CH] Switzerland ............... 00 846/92

[51] Int. Cl.⁵ ........................................... G01M 3/32
[52] U.S. Cl. ................................. 73/49.2; 73/37
[58] Field of Search ............. 73/37, 40, 45, 49.2, 73/41

[56] References Cited

U.S. PATENT DOCUMENTS

| | | | |
|---|---|---|---|
| 2,592,984 | 4/1952 | Walling | 73/37 |
| 3,805,594 | 4/1974 | Hayashi | 73/49.2 |
| 3,834,429 | 9/1974 | Schulz | 73/45 |
| 4,708,014 | 11/1987 | Janitz | 73/49.2 |
| 4,768,372 | 9/1988 | Lehmann | 73/49.2 |
| 4,837,707 | 6/1989 | Giometti et al. | 73/49.2 |

FOREIGN PATENT DOCUMENTS

| | | |
|---|---|---|
| 0217140 | 4/1987 | European Pat. Off. |
| 0279120 | 8/1988 | European Pat. Off. |
| 3108459 | 9/1982 | Fed. Rep. of Germany |
| 3722422 | 3/1989 | Fed. Rep. of Germany |
| 2021300 | 7/1970 | France |
| 8600701 | 1/1986 | PCT Int'l Appl. |
| 657209 | 8/1986 | Switzerland |

Primary Examiner—Hezron E. Williams
Assistant Examiner—Michael J. Brock
Attorney, Agent, or Firm—McCormick, Paulding & Huber

[57] ABSTRACT

The apparatus for checking the volume of bottles (1) comprises a head (2) adapted to be moved sealingly onto the bottle mouth (21), with a metering piston (7) which is displaceable in relation to the head (2) to be inserted into the bottle (1) and compress the air contained therein, and a pressure sensor (9) for measuring the excess pressure produced in the bottle. The measured volume (11) in the bottle is linked to a compensating volume (12) through a duct (10). The compensating volume is determined on the one hand by the constant starting height of the metering piston (7) and on the other hand by the variable displacement path length of the head (2). This ensures that the compression ratios are always the same for bottles of different heights, since differences of bottle height are compensated by a balancing piston (13) in the opposite direction, which alters the compensating volume (12) according to the sealing displacement path of the head (2) and thus always keeps the compressed measured volume exactly constant. The apparatus enables deviations in volume occurring in a series production process for plastic or glass bottles to be determined without the need to supply external air to the bottles. The measuring cycle is initiated by recording the pressure rise when the head (2) is placed upon the container (1).

14 Claims, 4 Drawing Sheets

METHOD AND APPARATUS FOR TESTING CONTAINERS

BACKGROUND OF THE INVENTION

The invention relates to a method of testing containers, more particularly glass or plastic bottles, involving placing a head sealingly onto the mouth of the container, putting the interior of the container under pressure by means of a metering piston which can be displaced in relation to the head, and measuring the pressure by means of a pressure sensor to check the volume of the container.

The invention further relates to an apparatus for implementing the method, comprising a head adapted to be moved sealingly onto a mouth of the container, a metering piston which is displaceable in relation to the head and can be used to pressurize the interior of the container, and a pressure sensor for measuring the pressure in the interior of the container.

One such apparatus is known in conjunction with an inspection machine for plastic bottles from DE 37 22 422 C2. In the case of this known apparatus the bottle can be clamped on a plate by means of a head fastened in freely rotatable manner to a vertically displaceable carriage. The interior of the bottle can be pressurised through the head, said pressure being recorded by a pressure sensor disposed on the head. The interior of the container is pressurised using a metering piston adapted to be displaceable at right angles to the head in a cylinder provided inside the carriage. A piston rod joined to the metering piston is able to be displaced against the pressure of a return spring by a cam disc attached to the machine frame via a follower roller. On the side of the metering piston nearest the return spring is a cylinder chamber. Whenever the metering piston is displaced, the air in this cylinder chamber is forced into the bottle along a bore provided in the head, and the pressure sensor records the pressure that builds up inside the bottle. An electronic analyser compares this pressure with a limiting value and subsequently actuates an ejector in the event of excessive deviation from this limiting value. A bottle of nominal volume has a given limiting pressure value. If the volume of the bottle is smaller or greater than the nominal volume, the limiting pressure value is respectively exceeded or not attained when the said volume of air is forced in.

The aforesaid inspection machine is primarily intended for inspecting returnable bottles made from plastic, ie. bottles returned by the customer and then refilled. The known apparatus works perfectly satisfactorily on this type of inspection machine. However, it has been shown that problems can arise if the apparatus is used on an inspection machine employed for series production of PET or glass bottles. Volume deviations may even occur in this sort of series manufacturing process. It is therefore necessary to check the volume of the bottles using an apparatus of the type indicated initially. If the volume deviations are outside a given tolerance, the bottles concerned again have to be identified as defective and removed. In this type of series production process the bottles, which have usually come from a blow moulding machine, contain warmed air. The volume of air forced into the bottle using the metering piston is relatively small in comparison to the volume of the bottle, and the excess pressure produced by forcing in the volume of air is correspondingly small. If in the series production process the measurement result is also affected by volumes of air at different temperatures, it is no longer possible to obtain reliable readings. Furthermore, it is in any event no simple matter to provide an external volume of air that is always constant and ideally at the same temperature and force it into a bottle, for in series production there is usually less than a second available for the entire check per bottle.

It has been found that fixing the start of the pressure measurements is a difficult matter. Yet a precise starting point for the pressure measurements is indispensable, for as a rule it is necessary in the very brief time available for measurement to take a plurality of pressure measurements under various defined measurement conditions.

SUMMARY OF THE INVENTION

It is therefore the object of the invention to simply and reliably fix the starting point for container testing.

In accordance with the invention this is achieved by the fact that the pressure sensor records the pressure gradient when the head is placed onto the container, and said gradient is used as the signal to begin the subsequent displacement of the metering piston and the pressure measurement.

It has been found that by analysing the pressure gradient when the head is put in place it is possible to fix with high accuracy the best starting point for the measurement cycle that follows. Because the pressure gradient can be recorded using the pressure sensor which is in any case provided, the method is simple and inexpensive to implement.

The testing of the container preferably includes a leakage measurement.

The invention further relates to an apparatus for carrying out the method. Said apparatus comprises a balancing piston to compensate for dissimilar container heights, as described below.

In the series production process for PET bottles, glass bottles and other containers it can happen that these vary in height. If the plate or conveyor on which the container is moved under the apparatus is always at the same height, then should the height of the containers vary the apparatus would give a false reading, for the depth to which the metering piston would penetrate the container would vary. Whilst it would be conceivable to raise or lower each container in the apparatus to suit the varying container height, in order to always start with the container mouth in the same position, this would entail considerable constructional costs, which is undesirable in order not to detract from the simplicity and operational reliability of the apparatus according to the invention.

In one embodiment of the invention it is achieved by using a fixed balancing piston to compensate for different heights of container whilst retaining a fixed metering piston drive mechanism and a fixed base level for the containers. A duct links a measured volume inside the container to a compensating volume inside a compensating chamber. The compensating volume is determined on the one hand by the constant starting position of the metering piston and on the other hand by length of the displacement path of the head, which varies according to the particular container height. This means that the compression ratios are always exactly the same for different heights of container.

Whilst it is not essential for the balancing piston and metering piston to be equal in diameter, if it were not so conversions would be needed, or the fixed link between the head and the cylinder would need to be replaced by a link with a variable transmission ratio, or the like.

Another embodiment of the invention employs a simple way of linking the interior of the container to the compensating chamber.

In still another embodiment of the invention a pneumatic rotary vane drive ensures a constant, rapid and damped plunging motion by the metering piston in a sinusoidal movement.

With the rotary vane drive fixed, the head is a pneumatically reciprocating piston in a fixed short-stroke cylinder and hence can always be placed onto the mouth of the container in a separate sealing stroke irrespective of the height of the container.

BRIEF DESCRIPTION OF THE DRAWINGS

An exemplary embodiment of the invention will now be described in more detail with reference to the drawings, wherein.

DESCRIPTION OF THE PREFERRED EMBODIMENTS

Figure 1:
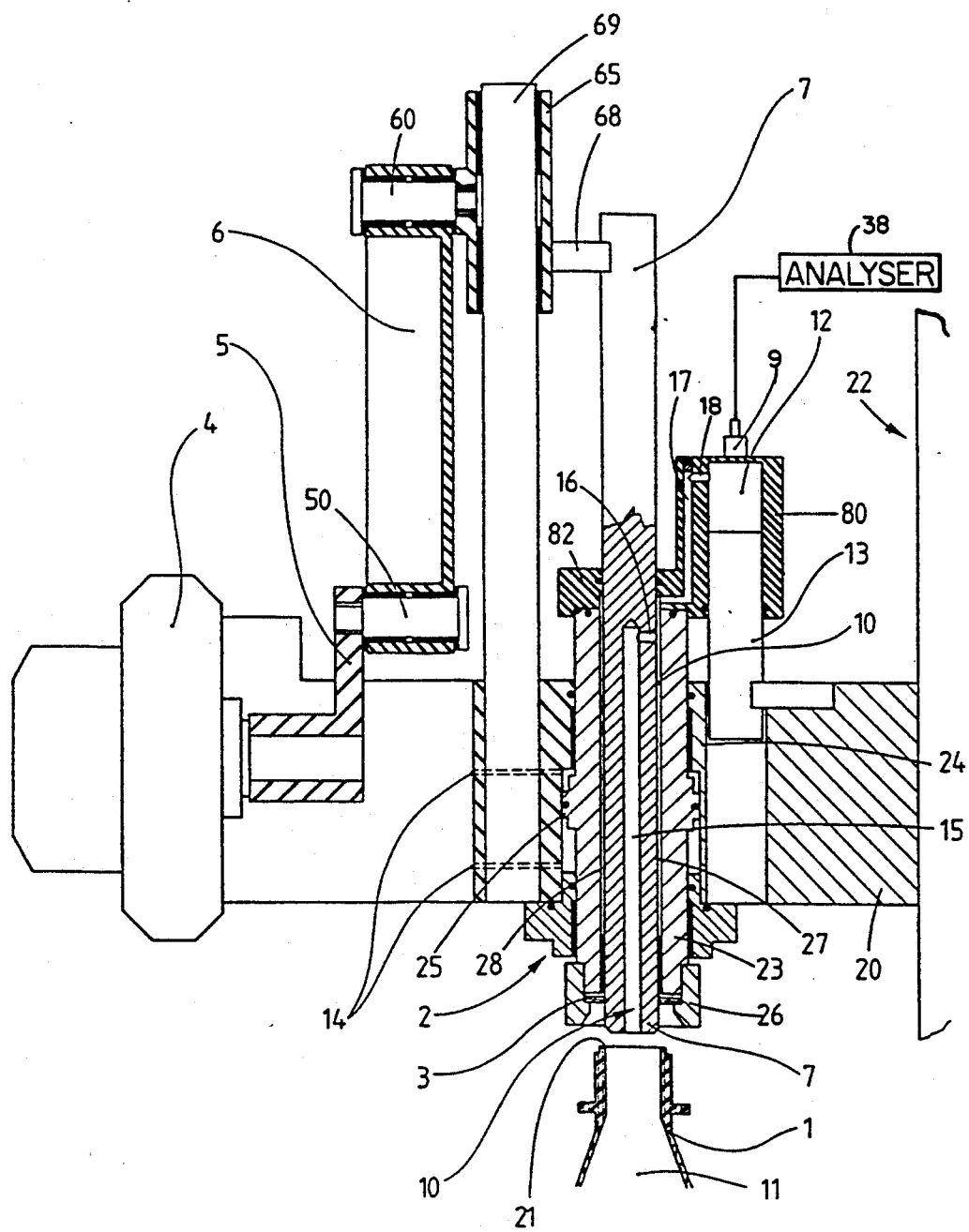
FIG. 1 is a sectional side view of an apparatus according to the invention.

FIG. 1 shows a sectional side view of an apparatus for checking the volume of containers. As an example of such a container, a bottle 1 is shown, which may be made of glass or plastic, preferably PET. The bottle 1 is moved along a conveyor (not shown) into the position depicted in FIG. 1 beneath the apparatus and once its volume has been checked it is moved on, eg. to a packing or filling station, or alternatively it is removed if a deviation in volume detected during the check is outside a given tolerance.

The apparatus is fixed to a carousel or frame 20 of an inspection machine 22. The apparatus has a head, designated overall by the reference 2, which is arranged to be vertically displaceable in the frame 20, allowing it to be moved sealingly onto the mouth 21 of the bottle 1. Externally the head 2 is in the form of a displaceable piston 23 reciprocating in a fixed short-stroke cylinder 24. At its lower end the piston 23 carries a nozzle 26, in which the mouth 21 of the bottle 1 can be received in a substantially playfree manner. On its lower end face inside the nozzle 26 the piston 23 has a seal 3, which comes to bear on the mouth 21 when the piston 23 is moved onto the bottle 1. The piston 23 protrudes upwardly and downwardly from the short-stroke cylinder 24 and is sealed by unreferenced O-rings on the bearing surfaces of the cylinder. The arrangement of these O-rings and of additional O-rings in the apparatus is readily apparent from FIG. 1 and need not be detailed further here. On its outer periphery the piston 23 comprises a collar 25 which divides the interior of the cylinder into upper and lower cylinder chambers. Ducts 14 deliver compressed air alternately to these cylinder chambers in order to move the piston 23 up and down.

The metering piston 7 is a cylindrical rod, which in a starting position illustrated in FIG. 1 is disposed roughly half in the head 2 and half outside it. The diameter of the metering piston 7, at least of the part that is to be inserted into the bottle 1, closely matches the inside diameter of the mouth 21 of the bottle 1. The piston 23 has a longitudinal bore 28 in which the metering piston 7 is displaceably accommodated. The longitudinal bore 28 is sealed in the manner that is apparent from FIG. 1. To introduce the metering piston 7 into the bottle 1, a drive mechanism 4 is provided in the form of a pneumatic rotary vane drive connected to a crank 5. The drive mechanism 4 is thus a crank drive and by means of a crankpin 50 it drives a piston rod 6 joined by a pivot pin 60 to a slide 65, which in turn is joined by a pin 68 to the top end of the metering piston 7. The slide 65 is displaceably arranged on a guide 69 parallel to the metering piston 7.

A cylinder 80 is fixed to the top end of the head 2 through a bracket 82 as illustrated in FIG. 1. The bracket 82 of the cylinder 80 provides the top closure of an annular chamber 27 formed in the cylinder 24 between the wall of the longitudinal bore 28 and the metering piston 7. A fixed balancing piston 13 is attached to the frame 20 by one end. The other end of the balancing piston 13 projects displaceably into the cylinder 80, which is open at the bottom, and defines a compensating chamber in said cylinder. The volume of the compensating chamber 12 varies with the downward stroke performed by the head 2 from the fixed starting position shown in FIG. 1 until it rests on the mouth 21 of the bottle 1.

A duct, designated overall by the reference 10, links the interior 11 of the bottle 1 to the compensating chamber 12. The duct 10 consists of a first bore 15 in the metering piston 7, opening through a first transverse bore 16 into the annular chamber 27 surrounding the metering piston in the head 2, and of a second bore 17 and a second transverse bore 18, by means of which the annular chamber 27 is linked to the compensating chamber 12. A sensitive pressure sensor 9 is connected to the compensating chamber 12.

Figure 2:
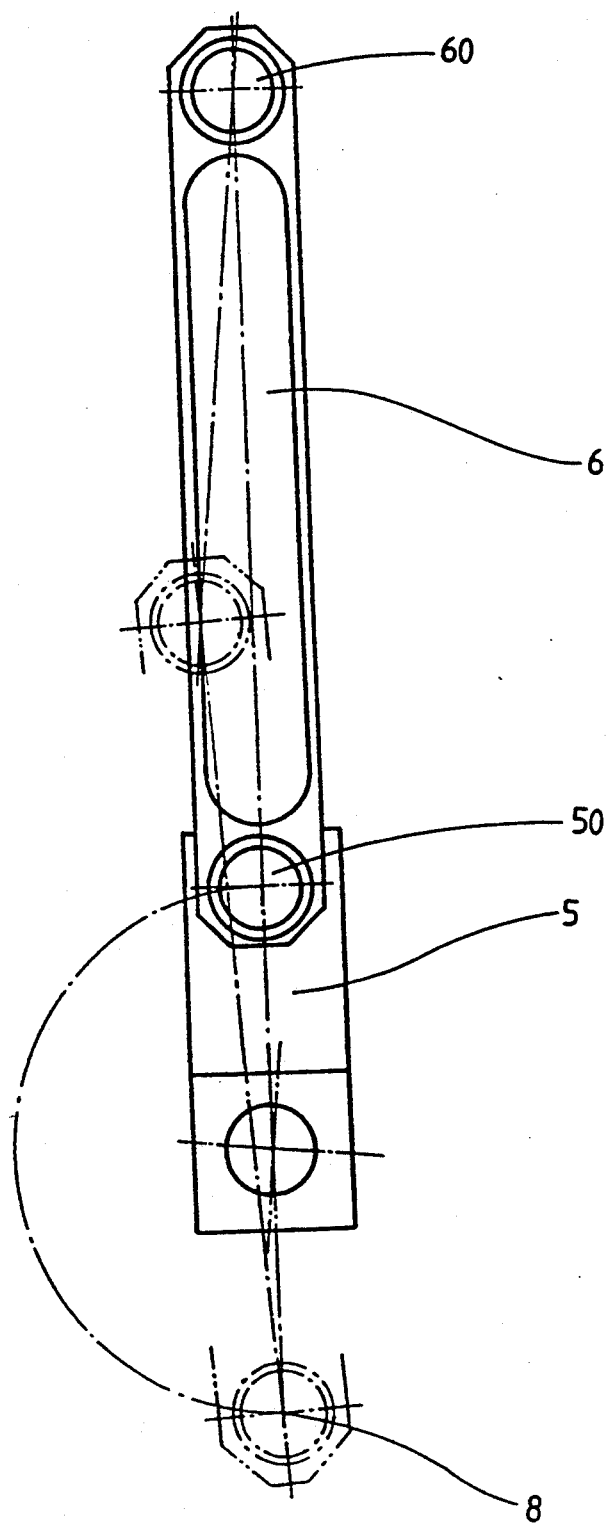
FIG. 2 is a detail from a crank drive used in the apparatus of FIG. 1, in two different operating positions.
Figure 3:
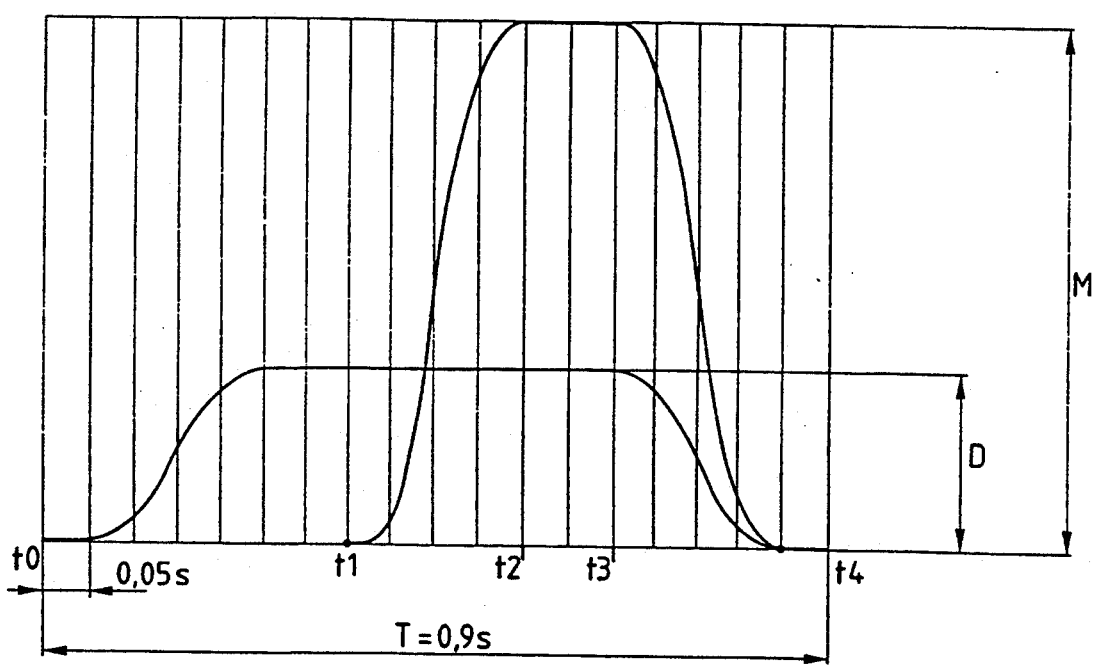
FIG. 3 is a working diagram of the apparatus according to FIG. 1, in which a measuring stroke and a sealing stroke have been performed over the available test period.

The mode of operation of the apparatus will now be described with additional reference to FIGS. 2 and 3.

Once there is a bottle 1 in the position beneath the head 2 depicted in FIG. 1, its pneumatic drive mechanism lowers the head onto the bottle by the admission of compressed air through the upper one of the ducts 14 from a compressed air source (not shown). The head 2 is lowered until the seal 3 seals against the bottle 1 with a preset pressure. FIG. 3 shows an interval from point $t_0$ to $t_1$ available for this sealing stroke D. At point $t_1$ the pneumatic drive mechanism 4 of the metering piston 7 is actuated, in order to initiate a measurement stroke M. The metering piston 7 is now plunged into the bottle by means of the crank 5 and the piston rod 6, until the crank 5 has reached bottom dead center 8 (FIG. 2), at point $t_2$. The pressure sensor 9 now measures the overpressure produced in the bottle 1, and sends the measurement to an analyser 38, for which an interval from point $t_2$ to point $t_3$ is available. From point $t_3$ the drive mechanism 4 returns the metering piston 7 to its starting position. At the same time the head 2 is also moved back to its starting position. In the example illustrated, the entire possible test period T, ie. the interval between $t_0$ and $t_4$, is 0.9 sec. Delays of 0.05 sec shown respectively at the start and end of the stroke in FIG. 3 are system-dependent.

The measured volume is the volume of the interior 11 of the bottle 1 plus the volume of duct 10. The volume of the compensating chamber 12 linked to the measured volume is determined on the one hand by the fixed starting height of the metering piston 7 and on the other hand by the length of the sealing stroke of the head 2. The compensating volume ensures that the compression ratios are always exactly identical for different bottle heights. This is because different bottle heights are compensated by the balancing piston 13, which is inserted in the opposite direction into the cylinder 80 and keeps the compressed measured volume always exactly constant.

Figure 4:
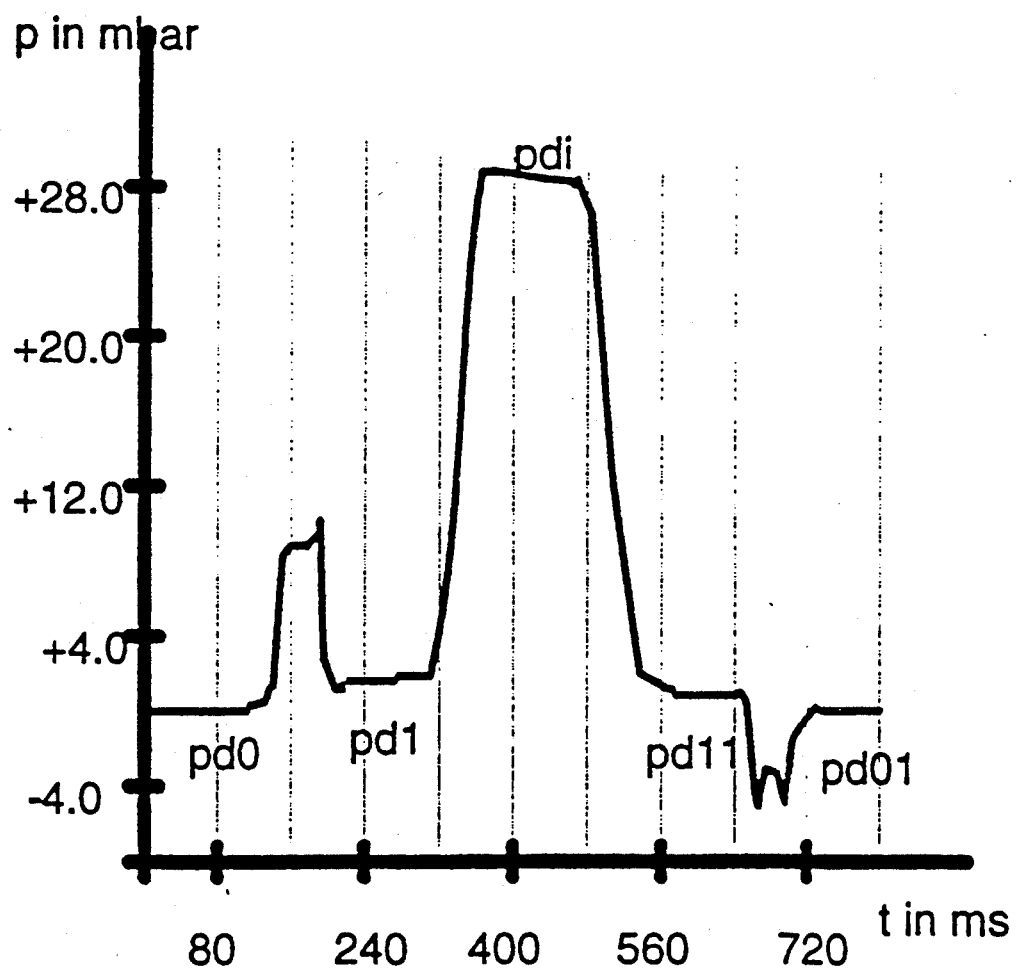
FIG. 4 is a diagram representing the pressure gradient at the pressure sensor against time while a container is being tested.

FIG. 4 shows the pressure gradient at the pressure sensor over time. The pressure rise and pressure fall are clearly visible in the 160 ms time range which follows the placing of the head onto the container. This pressure gradient is recognised by the analyser circuit for the sensor output signals and as the starting point for the following measurement cycle (measurements in the range pdI, pdi, pdII and pdOI). The leading edge, the peak or the trailing edge of the pressure increase may be used. The volume of the container can be checked from the pressure levels measured.

The two pressure measurements in the pdI and pdII ranges are preferably also used to detect the presence of a leak in the container. The size of the leak is proportional to the size of the pdI-pdII constant.

We claim:

1. Apparatus for testing bottle-like containers by pressurizing the interior of the container through the mouth of the container comprising:
   a head mounted for movement onto and in sealing engagement with the mouth of the container,
   a metering piston which is displaceable in relation to the head and through the mouth into the container to cause a part of the piston to displace gas within the container and pressurize the interior of the container, and
   a pressure sensor for measuring the pressure in the interior of the container,
   characterized in that a drive mechanism is provided for moving the head from an initial head position onto the mouth of the container, a cylinder is fixedly secured to the head, a fixed balancing piston projects into the cylinder to define a compensating chamber therein, the cylinder being displaceable relative to the fixed balancing piston with said displacement of the head, and a duct links the interior of the container to the compensating chamber, the pressure sensor being responsive to the pressure in the compensating chamber, and analysis means is linked to the pressure sensor for detecting the fluctuation in pressure produced in the compensating chamber when the head is placed on the container and the container is pressurized by said metering piston.

2. Apparatus according to claim 1, characterized in that the analysis means has a measurement cycle preset to take three pressure measurements following the detection of a first pressure fluctuation, the first and third pressure measurements being taken as the metering piston begins and ends its displacement relative to the head and through the mouth, and the second pressure measurement being taken at the maximum displacement of the metering piston into the container through the mouth.

3. Apparatus according to claim 2, characterized in that the analysis means includes means to detect from the first and third pressure measurements a leak in the container.

4. Apparatus according to claim 1, characterized in that the analysis means includes means to process multiple pressure readings in order to check the volume of the container.

5. Apparatus according to claim 1, characterized in that the metering piston is in the form of a plunger adapted to be introduced through the head and the mouth into the container.

6. Apparatus according to claim 5, characterized in that the plunger of the metering piston adapted to be introduced into the container is cylindrical and has a diameter that closely matches the inside diameter of the mouth of the container.

7. Apparatus according to claim 5, characterized in that a second drive mechanism is provided for introducing the metering piston into the container from a fixed metering piston starting position.

8. Apparatus according to claim 7, characterized in that the second drive mechanism is a crank drive.

9. Apparatus according to claim 8, characterized in that between the crank drive and the metering piston there is provided a guide parallel to the metering piston, on which a slide is arranged which is connected to the metering piston and to a piston rod linked to the crank drive.

10. Apparatus according to claim 8, characterized in that the crank drive is a pneumatic rotary vane drive.

11. Apparatus according to claim 1, characterized in that the balancing piston and the metering piston are cylindrical and have the same diameter.

12. Apparatus according to claim 1, characterized in that the metering piston is mounted in the head for displacement in relation to the head, the duct consists of a first conduit in the metering piston which opens into an annular chamber surrounding the metering piston in the head, and of a second conduit which links the annular chamber to the compensating chamber.

13. Apparatus according to claim 1, characterized in that externally the head is in the form of a displaceable piston and is arranged to reciprocate in a fixed short-stroke cylinder.

14. Apparatus according to claim 13, characterized in that the displaceable piston is arranged to be pneumatically operated.

* * * * *